United States Patent [19]

Yuta

[11] Patent Number: 4,781,504

[45] Date of Patent: Nov. 1, 1988

[54] TRIM CLIP

[75] Inventor: Kiyoteru Yuta, Toyohashi, Japan

[73] Assignee: Emhart Industries, Inc. (formerly USM Corp.), Farmington, Conn.

[21] Appl. No.: 52,805

[22] Filed: May 21, 1987

[51] Int. Cl.⁴ .............................................. F16B 21/00
[52] U.S. Cl. .................................. 411/512; 296/35.1;
403/407.1; 403/408.1; 411/188; 411/437; 411/508
[58] Field of Search ...................... 411/512, 185–188, 411/437, 508; 403/289, 407.1, 408.1; 293/128; 296/191, 35.1

[56] References Cited

U.S. PATENT DOCUMENTS

| | | |
|---|---|---|
| 843,720 | 2/1907 | Waddell et al. ................ 411/162 X |
| 1,854,800 | 4/1932 | Lowenfeld ..................... 411/512 X |
| 1,952,305 | 3/1934 | Beck ................................. 411/188 |
| 2,519,417 | 8/1950 | Tripp ............................... 411/309 X |
| 3,120,254 | 2/1964 | Waltermire et al. ............. 411/188 |
| 3,736,834 | 6/1973 | MacDonald ................... 411/512 X |
| 4,435,111 | 3/1984 | Mizusawa ....................... 411/512 X |
| 4,541,153 | 9/1985 | Schäty ............................ 411/437 X |
| 4,547,108 | 10/1985 | Nakama .......................... 411/508 X |
| 4,579,493 | 4/1986 | Schäty ............................ 411/437 X |
| 4,655,661 | 4/1987 | Brandt ............................ 411/412 X |

Primary Examiner—Lloyd A. Gall
Attorney, Agent, or Firm—Thomas S. Szatkowski

[57] ABSTRACT

A trim clip for fixing a decorative member onto a vehicle body trim from which a threaded stud has been previously secured by welding is provided. The clip features a hollow portion with resilient pawls for receiving the threaded stud and a head portion having at least one ridge formed on the surface facing the trim to prevent rotation due to vibration when the vehicle is moving.

5 Claims, 4 Drawing Sheets

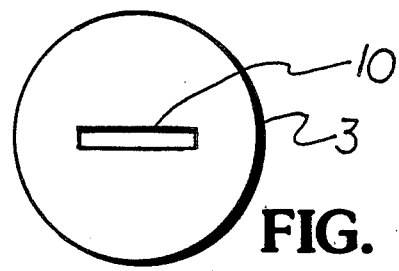
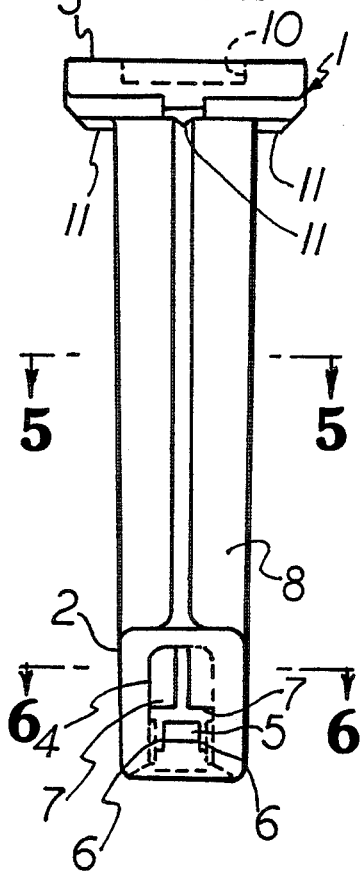
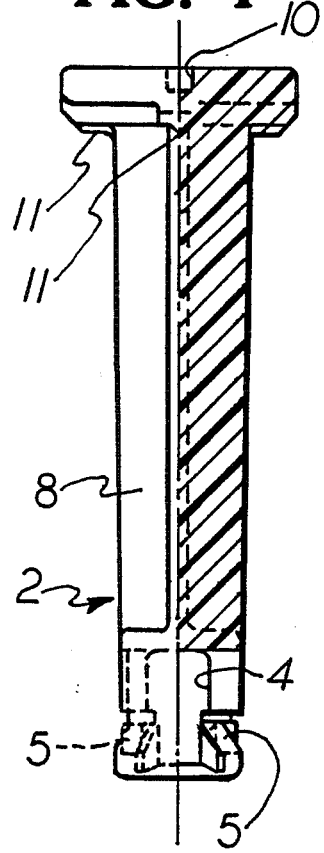
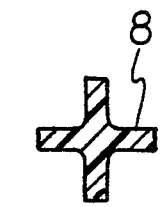
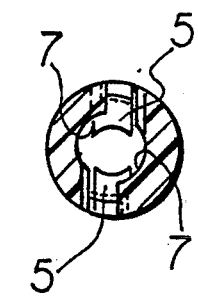
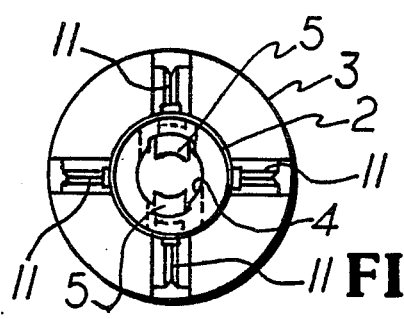

TRIM CLIP

BACKGROUND OF THE INVENTION

1. Field of Invention

The invention relates to a trim clip used for fixing a decorative member or trim onto a vehicle body, and more particularly to a clip for attaching a trim onto a vehicle body from which a threaded stud has been previously secured.

2. Description of the Prior Art

Clips for fixing trim moldings (hereinafter refered to as trims) onto a vehicle body through a threaded stud which has been previously secured to the vehicle body are known, but known designs vary in the ease in which they can be attached to the threaded stud. Three methods are mainly employed to attach such clips to the stud. The first method involves screwing the clip onto the stud. This method can offer a strong fixing force due to fastening, but requires the operating of screwing. The second method involves mechanically driving the clip such as by a hammer. This method can also offer a strong fixing force, but requires the clip to be properly positioned prior to the operating of driving. Also, excessive driving forces may produce cracks in the clip. The third method involves manually pushing the clip by the thumb. This method requires no need of using a screwdriver or hammer and hence is preferable in reducing the number of operations. The problem, however, is that a clip so positioned would rotate due to vibrations produced when the vehicle is moving and, in essence, be unscrewed from the threaded stud.

It is, therefore, an object of the present invention to provide a trim clip which is able to attach a trim when pushed and also to prevent the clip from being unintentionally rotated after fixing.

SUMMARY OF THE INVENTION

According to the present invention, a trim clip which is capable of fixing a trim onto a threaded stud secured to a vehicle body when the clip is pushed over the stud is provided. The trim clip comprises a shank which has at one end a hollow portion for receiving a shank of the stud and which is provided with resilient pawls projecting into a space of said hollow portion to be engaged with a groove or thread of the stud, and at the other end an expanded head portion having a diameter larger than that of a hole in said trim, said expanded portion including at least one radially extending ridge formed on the surface facing with said trim, said ridge being urged at a side face thereof against a ridge formed on said trim. The ridge can be engaged with or strike against a ridge formed on the trim. Accordingly, once the clip is pushed to bring the trim into a mounted state, the clip is prevented from rotating and hence cannot be loosened by road vibrations or the like.

BRIEF DESCRIPTION OF THE DRAWINGS

FIGS. 1 to 6 show a first embodiment of a clip according to the present invention in which;
FIG. 2 is a plan view,
FIG. 1 is a front view,
FIG. 3 is a bottom view,
FIG. 4 is a half-sectional side view,
FIG. 5 is a sectional view taken along the line 5—5 in FIG. 1,
and
FIG. 6 is a sectional view taken along the line 6—6 in FIG. 1,
FIGS. 7 to 9 show the surface of a trim in which;
FIGS. 10 to 15 show a second embodiment of the clip according to the present invention in which;
FIG. 10 is a plan view,
FIG. 11 is a front view,
FIG. 14 is a bottom view,
FIG. 12 is a sectional view taken along the line 12—12 in FIG. 11,
FIG. 13 is a sectional view taken along the line 13—13 in FIG. 11,
and
FIG. 15 is a sectional view taken along the line 15—15 in FIG. 14,
FIGS. 16—17 show ridges of the trim in which

DESCRIPTION OF THE PREFERRED EMBODIMENT

Figure 7:
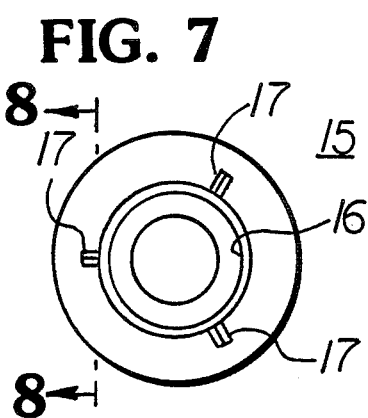
FIG. 7 is a partial plan view of the trim and
FIG. 8 is a sectional view taken along the line 8—8 in FIG. 7.

The preferred embodiments of the present invention will be described with reference to the drawings. FIGS. 1 to 6 show a trim clip according to the present invention. A clip 1 comprises a shank 2 and a head 3. The shank 2 has an outer diameter allowing it to pass through a hole in a trim, and a hollow portion 4 for receiving a shank of the stud is formed at the end opposite the head. A pair of pawls 5, 5 lockedly engaging with a groove or thread of the stud are formed so as to project into a space of the hollow portion 4. Slits 6, 8 are formed on both sides of each of the pawls 5 to provide resiliency, whereby the clip can readily be locked to the stud even when it is manually pushed on by the thumb. Above the pawls 5 projecting into the hollow portion 4, there are formed a pair of guide walls 7, 7 which serve to support and guide the shank of the stud. Such a guide wall may be formed throughout the inner circumference of the shank. However, the separate guide walls 7, 7 partially formed as illustrated are advantageous in that the required amount of materials and the weight of the clip can be reduced, and that the clip can be molded by making use of a double-split molding die when it is molded with plastic. Furthermore, between the shank 2 and the head 3 there is formed an extended portion 8 which has a height corresponding to that of the trim to be mounted. For the sake of reduction in both the required amount of materials and the weight, the expanded portion 8 is preferably shaped into the cruciform in cross section, for example, as shown in FIGS. 1 and 5, rather than a perfect cylinder.

The head 3 is formed as an expanded portion larger than the hole in the trim, and serves to hold the trim. Preferably, the head is formed in its upper surface with a minus (−) or plus (+) shaped slot 10 which is engageable with a screwdriver or the like, so that the clip 1 may be turned for removal. Radially extending ridges 11 are formed on the lower surface of the head 3 which is in contact with the trim. Although there are four ridges 11 in the illustrated embodiment, it is enough to provide at least one ridge. The length of each ridge is not always required to extend throughout the entire radius of the head 3, i.e., they may be stretched partially, so long as the ridge is able to engage with or strike against a corresponding ridge on the trim. Further, the ridge 11 is preferably shaped into the form of substantially V configuration in cross section so that, when the clip is strongly turned by a screwdriver or the like in the direction of unscrewing, the ridge 11 is caused to clear over the ridge on the trim for rotation of the clip, thus allowing the clip 1 to be removed from the stud.

Figure 8:
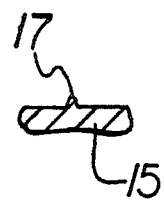

FIGS. 7 and 8 show the surface of the trim 15 which is in contract with the lower surface of the head 3 of the clip 1. The trim 15 has a hole 16 formed therein through which passes the shank 2 of the clip 1. Ridges 17 extending radially outwardly from the periphery of the hole 16 are formed with angular intervals therebetween in the circumferential direction. As will be seen from FIG. 8, the ridges 17 are each preferably shaped in a similar V shape as the ridges of the clip head 3. Although there are three ridges 17 in the illustrated embodiment, it is enough to provide at least one ridge. Also, the ridges 17 may be provided in greater number so long as the ridges 11 of the clip head can be arranged between the adjacent ridges 17 of the trim. As an alternative, the ridges 17 can be replaced by slots for receiving the ridges 11 of the clip head.

Figure 9:
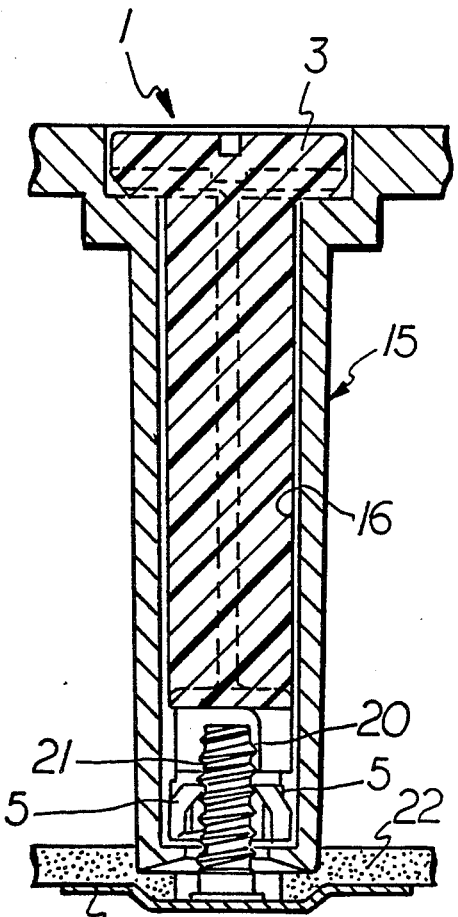
FIG. 9 is a sectional view showing the clip of FIGS. 1 to 6 in use.
Figure 10:
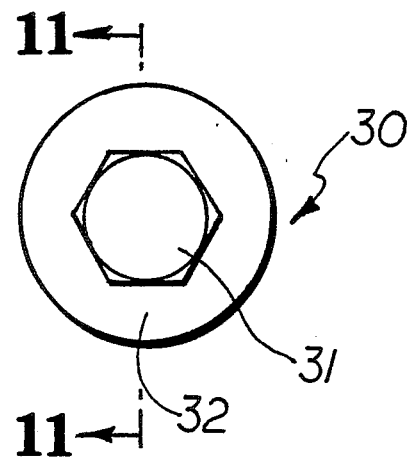
Figure 12:
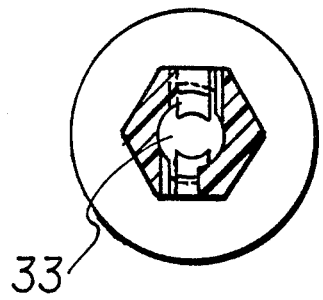
Figure 11:
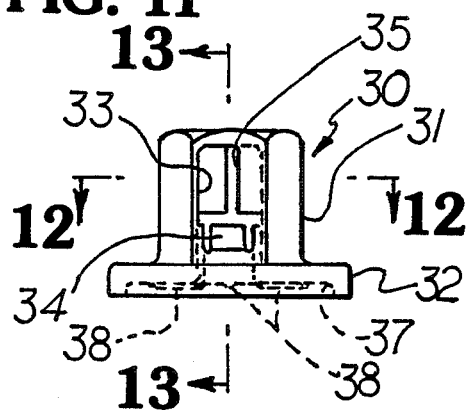
Figure 13:
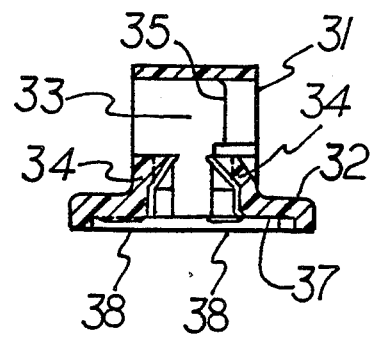
Figure 14:
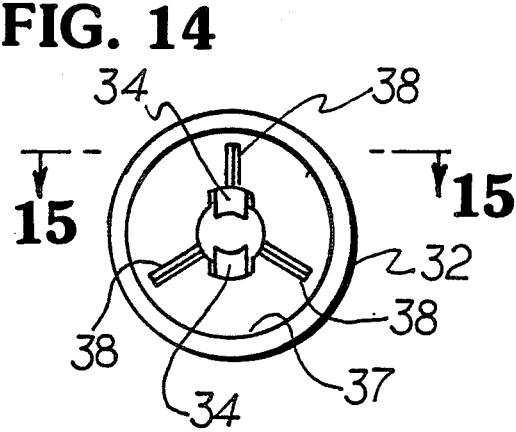
Figure 15:
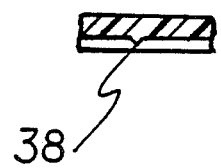

FIG. 9 shows the state in which the trim 15 is mounted onto a vehicle body 19 using the clip 1. A threaded stud 20 is secured to the vehicle body 19 by welding, and the pawls 5, 5 in the shank 2 of the clip 1 are lockedly engaged with a groove 21 of the stud 20. The trim 15 is fixed in position with a heat insulating panel 22 or the like disposed between the head 3 of the clip 1 and the vehicle body 19. With the provision of the resilient pawls 5, 5, the clip 1 can be locked to the stud 20 just by manually pushing it by the thumb. The clip will not be released from its locked condition unless the clip 1 is turned.

According to the present invention, because the ridges 11 are formed on the lower surface of the clip head 3 and located between the ridges 17 formed on the confronting surface of the trim 15, the clip 1 will not be turned due to vibrations of the vehicle body 19 unless it is forcibly turned. Further, because of the V-shaped form, any pair of the ridges 11, 17 can slide along their side faces on either side, even if they happen to strike with each other when the clip 1 is pushed over the stud. Moreover, the V-shaped form allows the ridges 11, 17 to slide along their side faces and clear over the respective tops, if the clip is forcibly turned by a screwdriver or the like in the direction of unscrewing thereof, so that the clip 1 may be removed.

FIGS. 10 to 15 show a second embodiment of the clip according to the present invention. A clip 30 of this embodiment comprises a shank 31 and a flange 32, the shank 31 having its outer periphery shaped into the hexagonal form. Also, the shank 31 has a hollow portion 33 formed therein, and includes pairs of pawls 34, 34 and guide walls 35, 35. The shank 31 has the same function as the shank 2 of the clip 1 according to the first embodiment except that shank 31 is shaped into the hexagonal form in cross section like a nut.

The flange 32 is formed as an expanded portion larger than a hole in a trim, and serves to hold the trim. The flange 32 has a recess 37 formed on the side opposite to the trim, and ridges 38 extending radially outwardly are formed on the surface of the recess 37. The ridges 38 are the same as the ridges 11 of the clip 1 according to the first embodiment in both function and design. In addition, similar to the ridges 11, the number of the ridges 38 can be selected and hence is not limited to three as is in the illustrated example.

Figure 16:
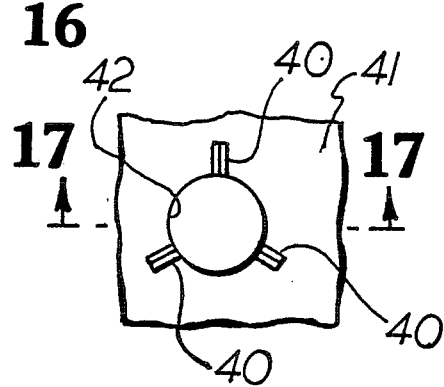
FIG. 16 is a plan view of the trim surface and
FIG. 17 is a sectional view taken along the line 17—17 in FIG. 16.
Figure 17:
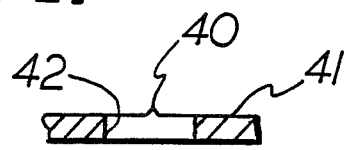

FIGS. 16 and 17 show ridges 40 formed as locking projections on the surface of the trim opposite to the flange 32 of the clip. Specifically, outside of a hole 42 bored through a trim 41 for receiving a stud, there are formed three ridges 40 with angular intervals in the circumferential direction, the ridges 40 each having the substantially V form in cross section as will be seen from FIG. 17.

Figure 18:
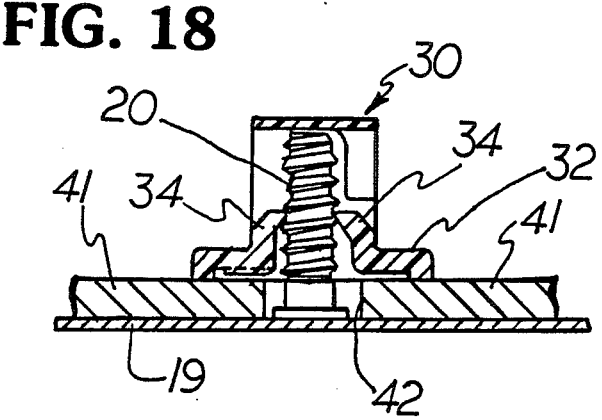
FIG. 18 is a sectional view showing the clip of FIGS. 10—15 in use.

As shown in FIG. 18, when the clip 30 is pushed over the threaded stud 20 which has been previously secured to the vehicle body, the pawls 34, 34 are lockedly engaged with the stud and the flange 32 presses the trim 41, whereby the trim 41 is mounted on the vehicle body 19. Then, the presence of the ridges 38 prevents the clip 30 from being turned due to vibrations of vehicles. But, the trim can be removed by forcibly turning the clip in the direction of unscrewing thereof with the aid of the hexagonal periphery of the shank 31.

According to the present invention, the clip can be attached with the sample operation of just pushing it and prevented from turning after once attached, with the result that the clip will never be loosened and slipped off due to vibrations. The present invention is suitable particularly for situations involving a trim to be mounted which is hard and exhibits no resiliency even when pressed by the clip.

I claim:

1. In a trim assembly for attachment to a threaded stud secured to a vehicle body which assembly comprises:
    a trim molding having a multiplicity of holes positioned such that upon attachment to said vehicle body said threaded studs extend therethrough and having ridges extending radially outwardly from the periphery of said holes; and
    a clip having a shank sized to fit through each said hole in said trim and having a hollow portion for receiving the shank of said stud, which hollow portion is provided with resilient pawls projecting into space of said hollow portion to be engaged with a groove of said stud, and an expanded head portion having a diameter larger than that of said hole in said trim, said expanded portion including at least one radially extended ridge formed on the surface facing said trim which upon attachment cooperates with said ridges located on said trim to prevent rotation of the clip.

2. The assembly according to claim 1 wherein said trim molding has a recessed portion sized to accommodate said expanded head portion of said clip and wherein said ridges are located within said recessed portion.

3. The assembly according to claim 1 wherein said ridges upon said trim molding have a substantially V-shaped configuration in cross section.

4. The assembly according to claim 1 wherein said at least one ridge upon said clip has a substantially V-shaped configuration in cross section.

5. The assembly according to claim 1 wherein said shank of said clip has a cruciform configuration.

* * * * *